V. DEL LUNGO.
SEAL LOCK.
APPLICATION FILED AUG. 27, 1913.
1,105,550. Patented July 28, 1914.
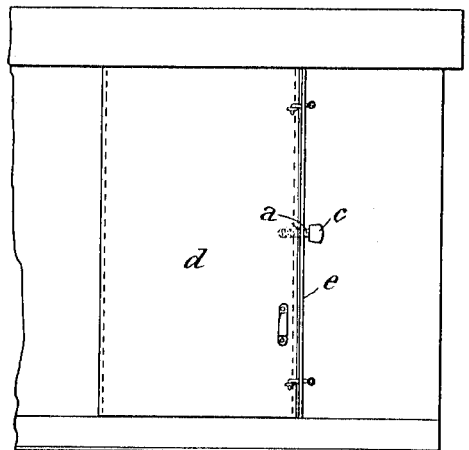
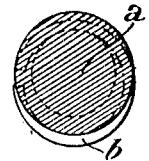
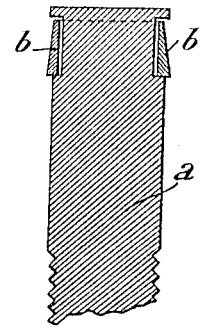
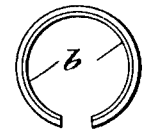
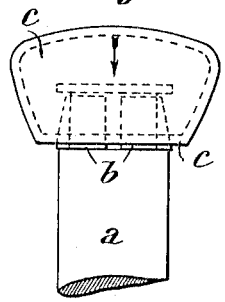
WITNESSES:
John N. Hoving
Alfred R. Anderson
INVENTOR,
Vincenzo Del Lungo
by W. H. Berrigan
ATTY.

UNITED STATES PATENT OFFICE.

VINCENZO DEL LUNGO, OF FLORENCE, ITALY.

SEAL-LOCK.

1,105,550.	Specification of Letters Patent.	Patented July 28, 1914.

Application filed August 27, 1913. Serial No. 786,970.

*To all whom it may concern:*

Be it known that I, VINCENZO DEL LUNGO, a subject of the King of Italy, residing at Florence, Italy, gentleman, (whose post-office address is 21 Borgo S. Lorenzo, Florence, Italy,) have invented a new and useful Seal-Lock, of which the following is a specification.

My present invention has for its object to provide an improved safety lock for doors of railway carriages, safes, trunks, postbags, office furniture, etc., which is simple of construction and operation, and designed to efficiently substitute the lead, sealing wax or similar locking means now in use.

My new safety lock substantially comprises a preferably metallic cylinder solidly secured with one end to a normally fixed part, while in the other, free end a rather deep circular recess is provided, adapted to receive a split (*i. e.* divided) elastic ferrule or ring conical in the exterior and cylindrical on the interior. The said ring owing to its being open or divided is capable of yielding under the pressure of a circular cap which having in its interior toward the rim an annular projection causes the elastic ring to reopen by reaction after having been compressed by the cap, as soon as the annular projection has passed the ring, thus producing, by its expansion greater than the diameter of the stud, a stop which prevents (by the said annular projection in its interior) the cap from being detached, thereby providing a safety lock, as it is impossible to open the door of the carriage or safe without breaking the cap.

In order that my said invention may be better understood I have illustrated same in one of its forms in the annexed drawings where—

Figure 1 shows same applied to a closed sliding car door, Fig. 2 is a view of my new safety lock on larger scale, with the cap in section; Fig. 3 is a section on line 1—1 of Fig. 2 showing the stop formed by the conical ring with its base, for preventing the cap being removed; Fig. 4 is a longitudinal section of the cylindrical body and elastic ring; Fig. 5 is a horizontal view of the elastic conical ring, and Fig. 6 shows the contracted position of the conical ring in the moment in which the annular rib of the cap is passing the base of the elastic ring.

In the said figures, —a— is the cylindrical body attached to the door, —b— the elastic conical ring surrounding the recess of the said body, —c— the cap, —d— the sliding door of a car, and —e— the door cleat. Cap —c— is designed to form the safety lock proper. It may be of an easily breakable transparent or opaque material, such as glass, porcelain, etc. As in order to open wagons, safes, trunks, office chests, etc., it is necessary to break each time the said cap, its material should also be of small cost, and unserviceable once broken. The end of cylinder —a— with which it is fixed to the door, etc., may be screw-threaded or otherwise shaped so as to engage bolts, screws, etc., and it is necessary that the said end is concealed so that it cannot be tampered with.

The operation of my above described safety lock is as follows: Suppose the stud is fixed to the door —d— of a car in the above described manner, for applying the safety lock it is necessary to push the sliding door —d— until stud —a— enters recess —f— of door cleat —e—, whereupon the two parts are secured together by the usual means (hooks, &c.), and then cap —c— is applied to stud —a—, Figs. 2 and 6, and pressed on in such a way that the elastic ring contracts so as to completely enter the recess; but as soon as the inner edge of the cap has glided beyond the base of the ring, it reexpands to the position shown in Fig. 3.

As the cap, as has been said, has an annular projection in its interior, it cannot be removed, being efficiently stopped by the base of the expanded elastic ring that it must be broken before it can be removed. For a further safeguard against undue tampering the cap may have special distinctive signs impressed therein.

Having thus fully described my said invention and the manner in which the same is to be performed, I declare that what I claim as my invention is:

In a safety lock, the combination of a cylindrical stud provided with an annualr recess near its outer end; a pair of relatively movable parts to one of which the inner end of the stud is fixed, the other part provided with an opening in which the intermediate part of the stud is received; a split ring received in said recess and having a cylindrical inner face and a conical outer face, the extreme inner and outer diameters of the ring being normally greater than the inner diameter of the recess and the diameter of the stud respectively; and a cap adapted to inclose said ring and having an annular shoulder of a smaller internal diameter than the largest normal diameter of the ring, and adapted to fit closely on said stud.

In testimony whereof I have signed my name to this specification in the presence of two subscribing witnesses.

VINCENZO DEL LUNGO. [L. s.]

Witnesses:
 FRANCISCO YOUDER,
 BRAZIO VILIANI.

Copies of this patent may be obtained for five cents each, by addressing the "Commissioner of Patents, Washington, D. C."